United States Patent
Pham

(10) Patent No.: US 12,399,864 B2
(45) Date of Patent: Aug. 26, 2025

(54) SYSTEM FOR PERMANENTLY STORING AND CONTROLLING A FILE AND ASSOCIATED METADATA ON THE BLOCKCHAIN

(71) Applicant: Joseph Vu Pham, Penrith (AU)

(72) Inventor: Joseph Vu Pham, Penrith (AU)

( * ) Notice: Subject to any disclaimer, the term of this patent is extended or adjusted under 35 U.S.C. 154(b) by 0 days.

(21) Appl. No.: 18/598,399

(22) Filed: Mar. 7, 2024

(65) Prior Publication Data
US 2024/0320191 A1    Sep. 26, 2024

(30) Foreign Application Priority Data
Mar. 20, 2023 (AU) .................. 2023900761

(51) Int. Cl.
*G06F 16/16* (2019.01)
*G06F 21/10* (2013.01)

(52) U.S. Cl.
CPC ........ *G06F 16/164* (2019.01); *G06F 21/1065* (2023.08)

(58) Field of Classification Search
CPC ............... G06F 16/164; G06F 16/1837; G06F 21/1065; G06F 21/602; G06F 21/6209; G06F 21/6254; G06F 21/64; G06F 3/067; H04L 9/0643; H04L 9/0894; H04L 9/50; H04L 63/0428; H04L 67/1097
See application file for complete search history.

(56) References Cited

U.S. PATENT DOCUMENTS

| | | | |
|---|---|---|---|
| 7,487,138 B2 * | 2/2009 | Borthakur | G06F 16/10 707/999.005 |
| 2017/0272209 A1 * | 9/2017 | Yanovsky | G06F 3/065 |
| 2020/0252205 A1 | 8/2020 | Padmanabhan | |
| 2021/0224405 A1 * | 7/2021 | Shrinivasan | H04L 9/0836 |
| 2022/0035950 A1 * | 2/2022 | Wakabayashi | G06F 12/1408 |
| 2023/0260187 A1 * | 8/2023 | Smith | H04L 9/50 345/473 |
| 2024/0320191 A1 * | 9/2024 | Pham | G06F 16/164 |

OTHER PUBLICATIONS

Jack Filiba, contributor to Trezor blog, "Creating permanent uncensorable messages on the Bitcoin blockchain", Apr. 7, 2021, 14 pp., https://blog.trezor.io/creating-permanent-uncensorable-messages-on-the-bitcoin-blockchain-fdbcb229732d.

\* cited by examiner

*Primary Examiner* — Robert W Beausoliel, Jr.
*Assistant Examiner* — Cheryl M Shechtman
(74) *Attorney, Agent, or Firm* — Kaplan Breyer Schwarz, LLP

(57) ABSTRACT

A system for permanently storing and controlling a file and associated metadata on the blockchain. The system includes: a file deconstruction module configured to receive a file from an engine output and divide the associated metadata into multiple chunks of ASCII where the system generates a code-based reference for each chunk; and an encoding module where the system permanently encodes each chunk and code-based reference and associated metadata on the blockchain, where the blockchain is capable of attribution of the code-based reference and associated metadata in a single transaction, and where the system recalls the file and associated database upon a user request by assembling the chunks from known code-based references stored in a github library.

15 Claims, 3 Drawing Sheets

SYSTEM FOR PERMANENTLY STORING AND CONTROLLING A FILE AND ASSOCIATED METADATA ON THE BLOCKCHAIN

RELATED APPLICATION

This application claims the benefit of Australian Provisional Application No. 2023900761, filed Mar. 20, 2023, the entire disclosure of which is incorporated herein by reference.

TECHNICAL FIELD

The present invention relates to a system for permanently storing and controlling a file and associated metadata on the blockchain, where the metadata is the underlying unique and attributable asset properties that are identifying the file.

BACKGROUND

The emergence of popular artificial intelligence content generation engines has created a need for new and complex methods for the referencing, tracking, controlling, storing and organisation of large amounts of new content data.

Blockchain is a decentralized digital ledger technology that enables secure, transparent and tamper-proof recording of transactions between parties. It was first introduced in 2008 as the underlying technology behind Bitcoin, a digital currency, and has since been used to power a variety of applications beyond cryptocurrency.

The blockchain is a distributed ledger that records transactions in a secure and transparent way. Each block in the chain contains a cryptographic hash of the previous block, which makes it virtually impossible to alter past transactions without the alteration being detected. This creates a highly secure system, as each transaction on the blockchain must be verified and approved by multiple parties in the network before it can be added to the chain.

Because blockchain transactions are verified and recorded in a decentralized and transparent way, they are often seen as a potential solution for a wide range of industries and use cases. These include financial services, supply chain management, voting systems, and more.

There are several different types of blockchain, including public, private, and consortium blockchains. Public blockchains are open to anyone and allow for anyone to participate in the network. Private blockchains, on the other hand, are permissioned and only allow certain users to participate in the network. Consortium blockchains are a hybrid of the two, allowing a select group of users to participate in the network while still maintaining a level of decentralization.

Within the blockchain ecosystem, a number of blockchains have introduced innovative capabilities, such as enabling smart contracts and embedding data with on-chain transaction. Cardano is one such blockchain, which offers users a two layer architecture that comprises of the Cardano Settlement Layer (CSL) where the movement of value and account balances are reconciled on the ledger. The second layer, called the Cardano Computation Layer (CCL), is designed to enable smart contracts and other complex data processing and computational functions on the network.

The Cardano allows users to transact and include up to 16 kilobytes of transactional metadata, which is encoded as Concise Binary Object Representation (CBOR), a binary data format based on Javascript Object Notation (JSON), allowing contextual data to be added to the blockchain permanently and in an immutable state on-chain. This allows data to be stored in a unique manner, with a defined timestamped and in a tamper resistant manner, preventing any third party user to modify or alter the encoded data.

This capability and functionality enables users on Cardano to perform complex functions, such as create on-chain Non-Functional Tokens and other assets, without the need for smart contracts. Furthermore, the Cardano network enables additional capabilities, such as storing large volume of metadata and Javascript code on the blockchain in an efficient and economical manner. This capability supports the embedding of a code-based reference library and register, which can be used to associate metadata stored from external systems on the Cardano network, in a manner similar to a secure reference code library stored on git-hub.

Within the emerging field of Artificially Generated Content (AGC), there also exists a need to securely record and store the prompt phrases and search terms that users submit to the array of Artificial Intelligence (AI) applications which has recently been used to generate derived creative works. AI stands for Artificial Intelligence, which refers to the development of computer systems and machines that can perform tasks that typically require skilled or advanced human intelligence, such as learning, problem-solving, pattern recognition, decision-making, natural language understanding, and perception. AI is a broad field that encompasses various subfields and techniques, including machine learning, deep learning, computer vision, natural language processing, robotics, and expert systems, among others. AI is used in various applications, such as healthcare, finance, manufacturing, transportation, entertainment, and more, and has the potential to transform many functional aspects of multiple businesses globally.

A commonly used text to image AI engine is called Midjourney, and has the capability to generate images from textual prompts and descriptions entered by users, in a similar way to tools such as OpenAI's DALL-E and Stable Diffusion. The tool allows the user to generate visual artwork with Midjourney using Discord bot commands.

Recently, images generated by Midjourney and subsequently used in a graphic novel 'Zarya of the Dawn' were found to not have inherited or have been granted copyright protection. The Copyright Office of the United States stated in a letter that whilst the story was copyright protected, given it was authored by a human, the visual images are not a product of human authorship and therefore can not be copyrighted.

This brings a potentially second useful use of the invention and Cardano, which may allow a user to immutably record and make reference to the search terms, type of AI engine and output result of the AI engine query used to create artificially generate art. This may be useful in the future when a creator or producer of artistic work needs to prove that they did not infringe on someone else's copyright and identify that no copyright exists for a given piece of work used to inspire or derive their own artistic work.

There are currently various systems, apparatus and devices that are commonly known in the art world that are adapted to provide a solution at the intersection of AI and blockchain.

US Patent Application No. 2020/0252205 A1 (Padmanabhan) discloses systems, methods and apparatuses for implementing a multi tenant blockchain platform for managing the Einstein cloud platform's decisions using Distributed Ledger Technology (DLT) commonly referred to as blockchain. A preferred embodiment of the prior art discloses a method performed by a computer where the method comprises the operating of the blockchain interface to a blockchain on behalf of a plurality of tenants of the host organisation, where each of the plurality of tenants operate as a participating node with access to the blockchain, configuring the blockchain to share training data set between two or more of the plurality of tenants pursuant to a consent agreement to share the training data set, training the AI model to make recommendations based on the training data set between two or more of the plurality of tenants, receiving a request to register the AI model with an audit record keeping service, receiving a transaction at the blockchain, issuing a decision by AI model to accept or reject the transaction and transacting the new asset onto the blockchain and recording the decision to accept or reject the transaction and the data set used to train the AI model and a version of the AI model.

There exists a problem and gap in the art space that can be resolved by this inventive system, which is able to record on a blockchain the metadata and contextual details around the original prompt or search query used in AI such that proof of the origination of AI generation can be used to dispute any alleged claims of copyright infringement.

Any discussion of the prior art throughout the specification should in no way be considered as an admission that such prior art is widely known or forms part of common general knowledge in the field.

SUMMARY

Problems to be Solved

It may be an objective of the present invention to provide a system for permanently storing and controlling a file and associated metadata on the blockchain.

It may be an objective of the present invention to provide a system for permanently storing and altering clauses, versions or variants to a digital file or the specification and storing the metadata and content associated with this file on the blockchain.

It may be an objective of the present invention to provide a system for permanently storing metadata associated with a file generated with artificial intelligence, where the metadata may include asset property information, the file and its contents.

It may be an objective of the present invention to provide a system for permanently storing metadata, where the metadata is a JSON string comprising a unique identifier, source system information, reference data relating to the training model of the AI engine used, type of AI generated content, the prompt or query data used to generate the AI content, the seed identifier, guidance scale value and the properties of the output file, such as file format and file dimensions.

It may be an objective of the present invention to provide a system for permanently storing a clause of a contract or legal status, where each clause is referenced in a unique class or category within a git-hub like data library such that each clause can be uniquely identified and referred to on a blockchain transaction.

It may be an objective of the present invention to overcome or ameliorate at least one of the disadvantages of the prior art, or to provide a useful alternative.

Means for Solving the Problem

In a first aspect of the present invention, there is provided a system for permanently storing and controlling a file and associated metadata on the blockchain, the system comprising a file deconstruction module configured to receive a file from an engine output and dividing the associated metadata into multiple chunks of ASCII and, the system generating a code-based reference for each chunk, an encoding module where the system permanently encodes each chunk and code-based reference and associated metadata on the blockchain, the blockchain being capable of attribution of the code-based reference and associated metadata in a single transaction, where the system recalls the file and associated database upon a user request by assembling the chunks from the known code-based references stored in a git-hub library.

Preferably, the associated metadata is asset property information identifying the file and its contents.

Preferably, the associated metadata is a JSON string comprising a system identifier, source information, model of AI engine used, type of AI generated content, the prompt used to generate the AI content, the seed ID, guidance scale and the dimensions.

Preferably, the file is a document.

Preferably, the associated metadata is edits made to particular sections of the document.

Preferably, the blockchain is the Cardano network.

Preferably, the metadata is transacted on the Cardano network in the form of a UTF-8 hex-encoded string.

Preferably, the system is a tangible, non-transitory, machine-readable medium storing instructions that when executed by one or more processors effectuate operations.

Preferably, the file is a document converted to plain text.

Preferably, the chunk is a clause of a document.

Preferably, the file is an artificially generated image.

Preferably, the metadata includes a Seed ID generated by an AI engine.

Preferably, the file and associated metadata is encrypted.

Preferably, the file and associated metadata is file sharded.

Preferably, the git-hub library is a reference document library.

In the context of the present invention, the words "comprise", "comprising" and the like are to be construed in their inclusive, as opposed to their exclusive, sense, that is in the sense of "including, but not limited to".

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

DESCRIPTION OF THE INVENTION

Preferred embodiments of the invention will now be described with reference to the accompanying drawings and non-limiting examples.

Although the invention has been described with reference to specific examples, it will be appreciated by those skilled in the art that the invention may be embodied in many other forms, in keeping with the broad principles and the spirit of the invention described herein.

Figure 1:
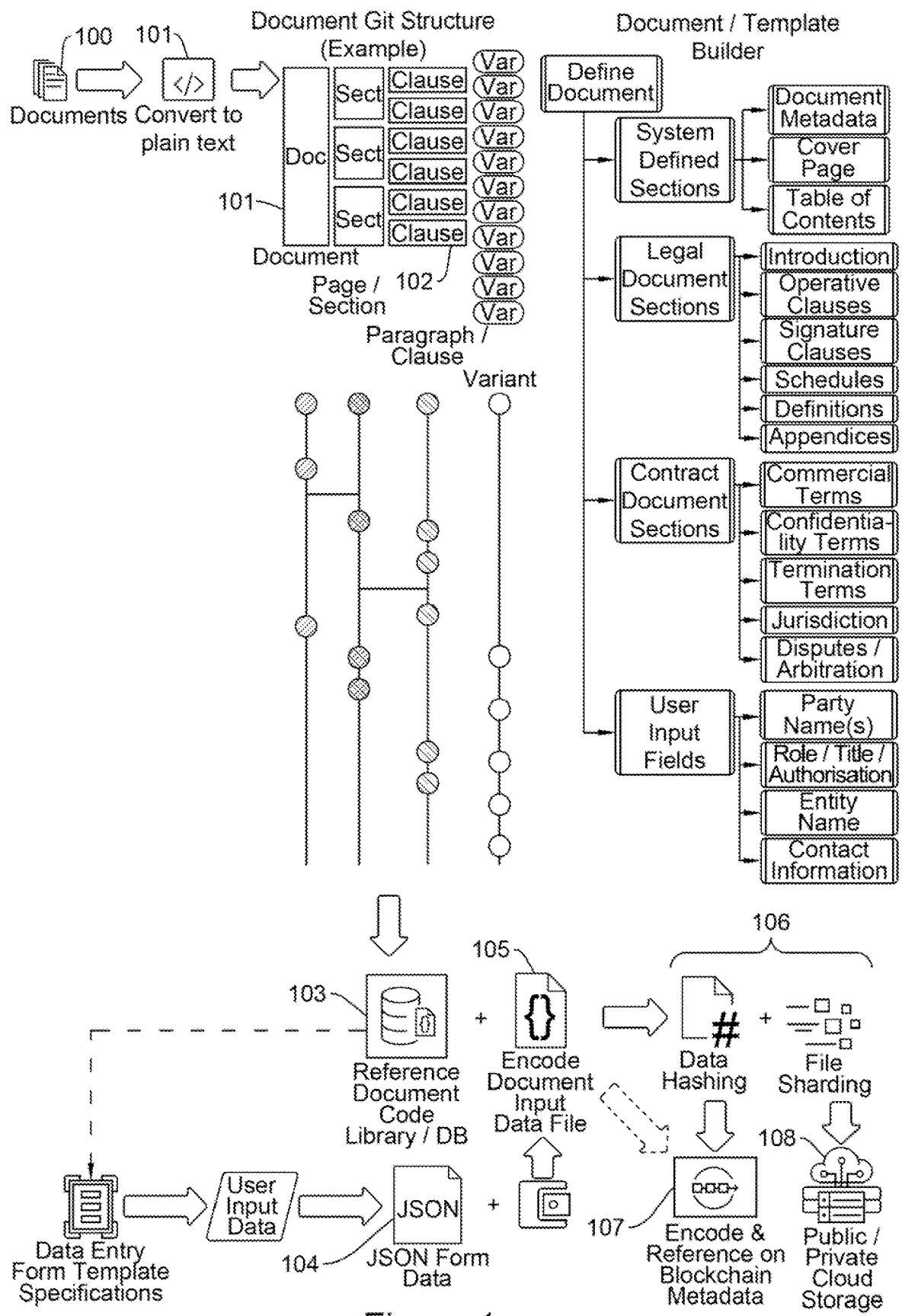
FIG. 1 is a schematic view of a preferred embodiment of the present invention where the file is a document, and the metadata is the underlying asset properties, the clause and the code-based reference used to refer to the clause in the reference library and blockchain.

A first preferred embodiment of the present invention where the file is a document is provided in FIG. 1. Referring now to FIG. 1, the system may take a document 100 in a standard format and break it into a plain text document 101. Using this plain text document 101, the system may convert it to chunks 102 which may include clauses 102. Each clause 102 may be referenced with a code-based reference and the code-based reference stored in a reference document library 103. The chunks 102 (also referred to as clauses) may be converted into JSON format 104 and combined in an encoded document 105. The encoded document 105 may then be transacted onto the blockchain in the form of metadata 104 or 105 on a blockchain 107 capable of attribution of the code based reference and associated metadata.

Referring further to FIG. 1, the encoded document 105 may be further secured or desensitised by data hashing or file sharding 106 the chunks 102 which are converted to an encoded document 105 by the system. This may provide a further layer of security, especially in instances where the clauses 102 of the document are strictly confidential, or contain personally identifiable information (PII). Further to this, the encoded document 105 may be stored on public or private cloud storage 108.

In another embodiment, the document 100 may be in a standard format such as Microsoft Word (.doc, .docx), Portable Document Format (.pdf), Rich Text Format (.rtf), OpenDocument Format (.odf) or HTML (.html) or similar equivalent. Microsoft Word is a popular word processing program used for creating and editing documents. It supports a wide range of formatting options and can be used to create documents with images, tables, and charts. The default file format for Microsoft Word is .docx, but older versions of the program may use .doc format. PDF is a file format that allows you to create documents that can be viewed on any device without the need for specialized software. PDF files are designed to be highly portable, which means they can be easily shared between different users and platforms without losing their formatting or layout. Rich Text Format is a file format that allows you to create documents that can be opened and edited by different word processing programs. It was developed as a cross-platform format that could be used by different operating systems and word processing applications. OpenDocument Format is an open standard for creating and editing office documents. It is used by many open-source office suites, such as LibreOffice and OpenOffice, and can be used to create documents that are compatible with other ODF-compliant applications. HTML is a markup language used for creating web pages. While not strictly a document format, HTML can be used to create documents that can be viewed in web browsers or converted to other formats, such as PDF.

In an abovementioned embodiment, the document 100 may be in a standard format and converted to plain text 101. This may be done via conventional method if the standard file is a MS Word file. Whilst each of the abovementioned standard document format 100 software has provisions for completing this, a method for performing this on MS Word may comprise: 1. Open the document you want to convert in Microsoft Word; 2. Click on "File" in the menu bar; 3. Click on "Save As" in the dropdown menu; 4. In the "Save As" dialog box, choose "Plain Text (*.txt)" from the "Save as type" dropdown menu; 5. Choose the folder where you want to save the converted file and click "Save"; 6. A dialog box may appear asking if you want to save the file with Line breaks or paragraph breaks. Choose the option that suits your requirement.

In another embodiment, the chunk 102 or clause 102 of the document may be a section of the document, variant or provision of a document 100 which was subsequently converted to plain text 101 by the system. A clause 102, for example in a legal context, is a specific provision or section that outlines the terms, conditions, or obligations of the parties involved. Clauses are often used to define the rights and responsibilities of each party, establish the scope and duration of the agreement, or specify any limitations or restrictions on the use or distribution of the product or service being provided. A contract or legal document may contain many clauses, each addressing a specific aspect of the agreement. Clauses can vary in length and complexity depending on the nature of the contract and the legal requirements that must be met. For example, a clause in a rental agreement might specify the monthly rent amount, due date, and payment method, while a clause in a business contract might outline the conditions for termination, liability, and dispute resolution. In the embodiment, each of these clauses 102 may be transacted separately so that version control on any amendments may be subsequently recorded on the blockchain 107.

In an embodiment, which is mentioned above, each clause 102 may be referenced with a code-based reference and the code-based reference stored in a reference document library 103. This may be achieved by conventional methods, such as GitHub. In GitHub, a reference document library can be created using the repository feature. A repository is a place where files, code, and other documents can be stored and managed. Whilst the method to achieve this is by no means limited, a preferred method to create a reference document library in GitHub may be performed in the following steps:

Step 1: Create a new repository: To create a new repository, log in to your GitHub account and click on the "New" button on the main page. Enter a name for your repository and choose whether you want it to be public or private.

Step 2: Add reference documents: Once you've created your repository, you can add reference documents by uploading files or creating new files directly within the repository. You can add any type of document, such as PDFs, Word documents, or Markdown files.

Step 3: Organize documents: GitHub allows you to organize your documents into folders or subdirectories to make it easier to find and navigate them. You can create new folders by clicking on the "New file" button and entering the folder name followed by a forward slash ("/") before the file name.

Step 4: Use tags or labels: GitHub also allows you to add tags or labels to your documents to make them easier to find and categorize. You can create tags by adding hashtags to the file description or by using the "Labels" feature in the repository.

Step 5: Share documents: Once your reference document library is set up, you can share it with others by providing them with the repository's URL or by adding them as collaborators to the repository.

The advantage of using a GitHub repository as the reference document library, is that it is possible to have a centralised location for storing the reference of the code-based reference encoded on the blockchain, such that the transaction comprising the clause 102 may be obtained by the interested parties. It also allows those using standard document templates to refer to each reference as a standard clause which is to be included in the contract or document, such that the standard clauses do not need to be transacted on the blockchain each time a contract or document is to be executed.

For example, a user may use standard clauses for the introduction, operative clauses, signature clauses, schedules, definitions, appendices, commercial terms, confidentially terms, termination terms and the jurisdiction. However, the user obviously is required to change the party names, roles/title/authorization, entity name and contact information. The user may use the reference document library to find the standard clauses already on the blockchain and make reference to these, however may transact new clauses with the personally identifiable information clauses which change when a new contract is to be drawn up. The reference to these transactions may then be referred to throughout creating permanency and proof of creation at any given time.

The format given to the system for encoding 105 in an embodiment of the present invention may be JSON 104. JSON (JavaScript Object Notation) is a lightweight data interchange format that is easy to read and write, and easy for machines to parse and generate. It is often used to transmit data between a server and a web application, as an alternative to XML. JSON is a text format that uses a simple syntax to represent objects, arrays, and key-value pairs. The basic structure of a JSON object consists of a set of name/value pairs, where the name is a string and the value can be a string, number, boolean, null, object, or array.

In another embodiment, before the JSON data 104 is converted to a encoded document 105, and transacted onto a blockchain 107, it may be data hashed 106 or file sharded 106 to provide a further layer of security. Blockchain transactions are peer-to-peer and thus are publicly readable. It may be a requirement of some clauses 102 (chunks) that they remain confidential.

Data hashing 106, also known as message digest or hash function, is a process of converting input data of any size into a fixed-size output value. The output value, known as a hash value or digest, is a unique digital fingerprint that represents the input data. Hashing algorithms take an input data, such as a file or a message, and generate a hash value that is typically a fixed-length alphanumeric string. The hash value is unique to the input data, and any changes to the input data will result in a different hash value. Hash functions are designed to be one-way functions, meaning that it is extremely difficult or impossible to reverse-engineer the input data from the hash value. Data hashing has many practical applications, such as password storage, data integrity verification, digital signatures, and data encryption. In password storage, for example, the password is hashed and stored in a database instead of the actual password. When a user enters a password, the system hashes the input and compares it with the stored hash value. If they match, the user is granted access. Common hashing algorithms include MD5, SHA-1, SHA-256, and SHA-512. However, some of these algorithms have been found to be vulnerable to attacks, and newer and more secure algorithms have been developed to replace them.

File sharding 106, also known as file splitting or data partitioning, is a technique of dividing a large file into smaller, more manageable pieces or shards. Each shard is usually of equal size, and is stored in a different location or device. In this case, each shard may be transacted on an independent blockchain transaction such that without knowing all of the transactions, someone is unable to identify the contents or meaning of the clause. By dividing a file into smaller shards and storing them in different locations or devices, the risk of unauthorized access or theft can be reduced. If an attacker gains access to one shard, they will not be able to access the complete file without also accessing all the other shards. File sharding can be combined with encryption and access control mechanisms to further enhance data security. Each shard can be encrypted using a different key or code-based reference, and access to the shards can be restricted based on user privileges and authentication.

Figure 2:
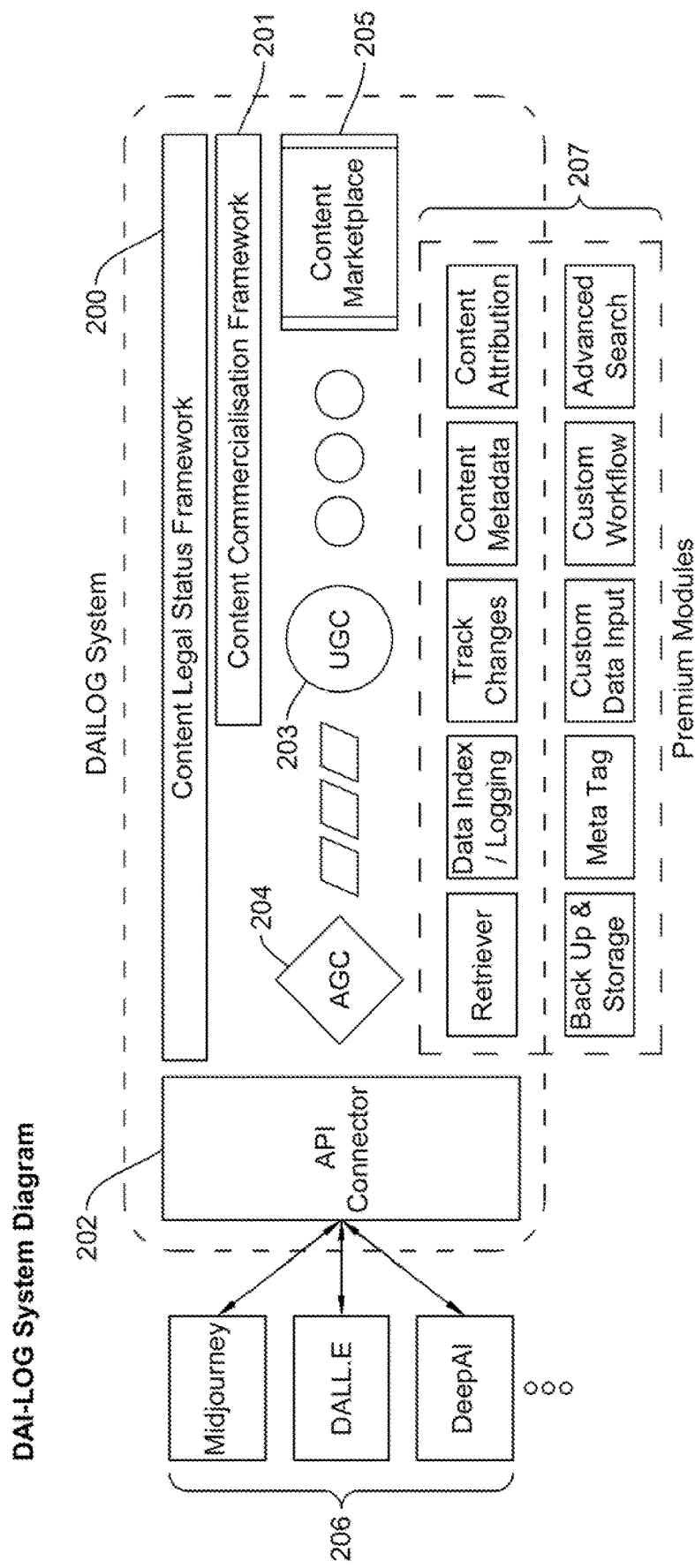
FIG. 2 is a schematic view of a preferred embodiment of the present invention, where the file is artificially generated content, and the metadata is the user generated content, engine used and the content generated.
Figure 3:
FIG. 3 is an embodiment based on the schematic view presented in FIG. 2, where a preferred embodiment is an artificially generated content, namely an AI generated image, and the metadata is the underlying asset properties and prompts used to generate said AI generate image.

A second preferred embodiment of the present invention where the file is artificially generated content, and the metadata is the user generated content, engine used and the content generated is provided in FIG. 2. Referring now to FIG. 2, the system may take content from a content marketplace 205, UGC (User generated content) 203 and AGC (artificially generated content) 204 and record the output of each as a file (substance and content) and metadata (underlying asset properties). The AGC 204 may be received via an API connector 202 from a selection of AI engines 206, including but not limited to Midjourney, DALL.E and DeepAI. The combination of AGC 204, UGC 203 and subsequent output at the content marketplace 205 may form the content legal status framework 200. The content legal status framework 200 and its components, AGC, UGC and content marketplace must be recorded as file and metadata and permanently recorded on the blockchain (not imaged) for purposes of proving originality when required.

An example of the preferred embodiment of FIG. 2 may be applied to a document produced with a combination of user generated content 203 and artificially generated content. For example, the content marketplace 205 may contain a document, a work of fiction titled 'The Day in the Life of A Patent Attorney Called Harvey Specter'. The content commercialisation framework 201 involves the selling of the work of fiction on the content marketplace 205 as a result of user generated content 203 fed via an API connector 202 to the AI engine ChatGPT 206. The user generated content 203 comprised prompts such as 'describe the type of coffee that Harvey Specter drinks'. As a result, a response may be received via the API connector 202 forming artificially generated content 204 which states 'iced almond flat white'. This is then recorded, and this interaction is recorded on the blockchain, as well as a reference, result and metadata. The metadata may be underlying asset properties, including but not limited to the source, AI model used to generate the response, the prompt given as a result of user generated content 203 and the seed ID.

In another embodiment, standard and conventionally available additional features may be recorded in the metadata, such as track changes, data logging, retriever, content attribution data, back up and storage data, meta tags, custom data input, custom workflow and the advanced search.

In many of the embodiments, the metadata is recorded on the blockchain as part of the transaction, as well as the contents of the file and the code-based reference so that it can be referred to throughout a document. Metadata is information about data, such as a file, document, or database, that provides additional context and description about the data. There are many different types of information which may comprise metadata, including but not limited to:

Descriptive metadata: information about the content, format, language, and structure of the data. For example, the author, title, date, and keywords of a document.

Technical metadata: information about the technical aspects of the data, such as the file format, size, resolution, and encoding.

Administrative metadata: information about the management and administration of the data, such as access control, versioning, and ownership.

Structural metadata: information about the relationships and dependencies between different data elements, such as the fields in a database or the pages in a document.

Metadata is typically stored separately from the data it describes, and is used by software applications, search engines, and other systems to manage and access the data. Metadata can be created manually, such as by a user entering descriptive information about a document, or automatically, such as by a system extracting technical information about a file.

In a preferred embodiment, an API connector 202 is required to connect the AI engine 206 to the user. This allows the user, via the system, to connect with the AI engine and post and receive the appropriate prompts. An API connector is a software component that allows different applications or systems to communicate and exchange data through an API (Application Programming Interface). An API connector acts as an intermediary between two or more systems, translating requests and responses from one system into a format that can be understood by another system.

API connectors can be built using various programming languages and technologies, such as REST (Representational State Transfer) APIs, SOAP (Simple Object Access Protocol), or GraphQL. Some API connectors may provide pre-built integrations with popular applications or services, while others may require custom development or configuration.

In another embodiment, the AI engine may be Midjourney. Midjourney is an independent research lab that produces an artificial intelligence program under the same name that creates images from textual descriptions, similar to OpenAI's DALL-E and Stable Diffusion. It is speculated that the underlying technology is based on Stable Diffusion. The tool is currently in open beta, which it entered on Jul. 12, 2022. The Midjourney team is led by David Holz, who co-founded Leap Motion. Holz told The Register in August 2022 that the company was already profitable. Users create artwork with Midjourney using Discord bot commands.

In another embodiment, the AI engine may be DALL.E. DALL-E (stylized as DALL·E) and DALL-E 2 are deep learning models developed by OpenAI to generate digital images from natural language descriptions, called "prompts". DALL-E was revealed by OpenAI in a blog post in January 2021, and uses a version of GPT-3 modified to generate images. In April 2022, OpenAI announced DALL-E 2, a successor designed to generate more realistic images at higher resolutions that "can combine concepts, attributes, and styles". DALL-E can generate imagery in multiple styles, including photorealistic imagery, paintings, and emoji. It can "manipulate and rearrange" objects in its images, and can correctly place design elements in novel compositions without explicit instruction. Thom Dunn writing for BoingBoing remarked that "For example, when asked to draw a daikon radish blowing its nose, sipping a latte, or riding a unicycle, DALL-E often draws the handkerchief, hands, and feet in plausible locations." DALL-E showed the ability to "fill in the blanks" to infer appropriate details without specific prompts, such as adding Christmas imagery to prompts commonly associated with the celebration, and appropriately-placed shadows to images that did not mention them. Furthermore, DALL-E exhibits a broad understanding of visual and design trends.

In another embodiment, the AI engine may be DeepAI or ChatGPT-3 or recently released/soon to be released ChatGPT-4.

A third preferred embodiment of the present is an embodiment based on the schematic view presented in FIG. 2, where a preferred embodiment is an artificially generated content, namely an AI generated image, and the metadata is the underlying asset properties and prompts used to generate said AI generate image. The file is an image 300 produced by Midjourney, an AI engine. The UGC 312 is a prompt 305 instructing Midjourney to produce an image of a 'photorealistic fantasy Princess'. The file 300 may be encoded as a document ready for transacting on the blockchain, along with a code-based reference, and the metadata used to generate the image 310 may also be transacted to prove that there is no copyright infringement. The metadata used to generate the image 310 may be the underlying content asset properties, such as DAILId 301, the source 302, the model of the AI engine 303, the type of content generated 304, the prompt used to generate the content 305, the seed ID 306, the guidance scale 307 and the dimensions of the generated content 308.

A seed ID is a randomly generated number or sequence of numbers that is used as an input to initialize the random number generator algorithm. The random number generator algorithm is a mathematical function used to generate a sequence of numbers that appear to be random. In machine learning, the seed ID is used to control the randomization process during training and evaluation of the models. By setting the seed ID, the random number generator algorithm can generate the same sequence of random numbers each time the program is run, which can help ensure that the results are consistent and reproducible. For example, when splitting a dataset into training and validation sets, setting the seed ID ensures that the same samples are selected each time the program is run, which can help prevent bias or overfitting.

In most embodiments, the file and associated metadata is encoded onto a blockchain capable of attribution of the code based reference and associated metadata in a single transaction. This is not limited by any means, however is best suited in a blockchain capable of attribution of metadata as a JSON string.

In another embodiment, the blockchain is Cardano. Cardano is a decentralized blockchain platform that allows developers to build and deploy decentralized applications (dApps) and smart contracts. It is named after the Italian mathematician Gerolamo Cardano and was developed by IOHK, a blockchain research and development company. Cardano uses a proof-of-stake consensus algorithm called Ouroboros, which allows users to participate in the network and earn rewards by staking their ADA cryptocurrency. The platform also features a multi-layered architecture, with separate layers for computation and settlement, which can help improve scalability and security.

In Cardano, data can be attributed as a JSON string by encoding it in the JSON format, which is a lightweight data interchange format. JSON stands for JavaScript Object Notation and is a simple, text-based format for representing data in key-value pairs. To attribute data as a JSON string in Cardano, developers can use the JSON schema to define the data structure and format, and then encode the data in JSON format using a programming language or tool that supports JSON serialization. The encoded data can then be stored on the blockchain as a transaction, a smart contract, or a dApp state, and can be accessed and manipulated using the appropriate Cardano API. The use of JSON strings in Cardano can enable interoperability and data sharing between different applications and systems, as JSON is a widely supported format that can be easily parsed and processed by many programming languages and tools. However, developers must also consider the security and privacy implications of storing and transmitting sensitive data as a JSON string, and implement appropriate encryption, access control, and data protection measures.

In another embodiment, the blockchain is the Bitcoin network, users can attach a small amount of data to a transaction using a special script called OP_RETURN. This script allows users to include up to 80 bytes of arbitrary data in a transaction, which can be used to attribute additional information to the transaction.

Certain blockchains, such as Bitcoin, have the capacity to store data on-chain. For Bitcoin, that is up to 160 hexadecimal characters in encoded in various output fields, such as PubKeyHash (https://blog.trezor.io/creating-permanent-uncensorable-messages-on-the-bitcoin-blockchain-fdbcb229732d). This may enable the inclusion of simple comments or notes, but does not support more complex node-to-node (N2N) data communication requirements, which often require more complex data parameters and metadata standards.

In another embodiment, the blockchain is the Ethereum network, users can attach data to a transaction using the input field of a smart contract function call. This data can be in the form of a JSON string or other structured data format, and can be used to attribute additional information to the transaction or to trigger certain actions within the smart contract.

Alternatively, the Ethereum Smart Contract blockchain supports on-chain storage through a fee based transaction cost model, where the fee is paid as Gas (GWEI). The formula for transaction fees is:

Total GAS=21,000+Input Data Fee+Gas Used−Gas Refund

Where the raw data input fee is calculated as 4 GWEI fee per Zero (00) byte of code or data and 16 GWEI gas fee per non-zero byte of code or data. Even basic transactions, at its price heights, standard transactions (without metadata) were costing hundreds, sometimes thousands of dollars to process, due to the incentive model for miners to pick the highest paying transactions to process first.

The Ethereum data fee model derives from the nature and purpose of the Ethereum network, as a global decentralised computing network. As such, it is not practical or economically feasible to run complex or large on-chain data communication processing on Ethereum or other similar Ethereum Virtual Machine (EVM) blockchains. Instead, Ethereum promotes the use of off-chain data referenced storage systems, such as the Inter Planetary File System (IPFS), which operates as a decentralised, peer to peer file storage network.

Of all mainstream public blockchain networks currently available, Cardano presents the most viable layer 1 blockchain to store encoded asset, document and file information directly on chain (as data included in the public blockchain). This is due to the inherent design of the Cardano transaction metadata capacity space-Cardano enables up to 16 kilobytes (16 kb=16,000 characters) of JavaScript Object Notation (JSON) metadata included with each and every transaction.

In addition, this large storage capacity cost up to transaction script fee of 2.17 ADA which is nominal at current and even at its price peaks ($3 per ADA).

Based on these parameters, Cardano is an ideal blockchain to demonstrate the viability of this system and develop a layer 2 specialised blockchain that is optimised to support and enable dynamic file storage using this approach.

The invention claimed is:

1. A system for permanently storing and controlling a file and associated metadata on a blockchain, the system comprising:
   a file deconstruction module configured to receive the file from an engine output and dividing the associated metadata into multiple chunks of ASCII;
   the system generating a code-based reference for each of the chunks;
   an encoding module wherein the system permanently encodes each of the chunks and code-based reference on the blockchain;
   the blockchain being capable of attribution of the code-based reference and associated metadata in a single transaction;
   wherein the system recalls the file and associated database upon a user request by assembling the chunks from known code-based references stored in a git-hub library.

2. The system of claim 1, wherein the associated metadata is asset property information identifying the file and its contents.

3. The system of claim 2, wherein the file is a document.

4. The system of claim 3, wherein the associated metadata is edits made to particular sections of the document.

5. The system of claim 1, wherein the associated metadata is a JSON string comprising a system identifier, source information, model of AI engine used, type of AI generated content, a prompt used to generate the AI content, a seed ID, guidance scale and dimensions.

6. The system of claim 1, wherein the blockchain is a Cardano network.

7. The system of claim 6, wherein the metadata is transacted on the Cardano network in the form of a UTF-8 hex-encoded string.

8. The system of claim 1, wherein the system is a tangible, non-transitory, machine-readable medium storing instructions that when executed by one or more processors effectuate operations.

9. The system of claim 1, wherein the file is a document converted to plain text.

10. The system of claim 1, wherein each of the chunks is a clause of a document.

11. The system of claim 1, wherein the file is an artificially generated image.

12. The system of claim 1, wherein the associated metadata includes a Seed ID generated by an AI engine.

13. The system of claim 1, wherein the file and associated metadata is encrypted.

14. The system of claim 1, wherein the file and associated metadata is file sharded.

15. The system of claim 1, wherein the git-hub library is a reference document library.

* * * * *